United States Patent Office 3,335,146
Patented Aug. 8, 1967

3,335,146
PYRIDINOL COMPOUND
Walter Reifschneider and Jacqueline S. Kelyman, Midland, Mich., assignors to The Dow Chemical Company, Midland, Mich., a corporation of Delaware
No Drawing. Filed June 1, 1965, Ser. No. 460,556
22 Claims. (Cl. 260—294.8)

This is a continuation-in-part of my copending patent application Ser. No. 412,321, filed Nov. 19, 1964, now abandoned.

The present invention is directed to pyridinol compound selected from the group consisting of

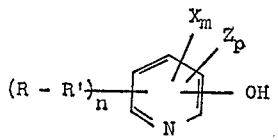

(I)

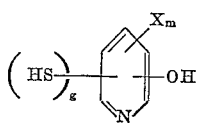

II
and
(III)   S-metal salt of (II)

whereof the metal is a member selected from the group consisting of sodium, potassium, copper$^{(+1)}$, tin$^{(+2)}$, lead$^{(+2)}$, and zinc. Further, in the above and succeeding formulae, R represents a member, the same in each occurrence, selected from the group consisting of alkyl, substituted alkyl, alkenyl, alkynyl, phenyl, and substituted phenyl; R' represents a member, the same in each occurrence selected from the group consisting of thio, sulfinyl, and sulfonyl; each X independently represents a member selected from the group consisting of bromo, chloro, and loweralkyl; Z represents a member selected from the group consisting of cyano, nitro, and iodo; $n$ represents an integer of from 1 to 4, both inclusive; $m$ represents an integer of from 0 to 3, both inclusive; $p$ represents an integer of from 0 to 1, both inclusive; $g$ represents an integer of from 1 to 2, both inclusive, the sum of $n$, $m$, and $p$ in Formula I being an integer of from 1 to 4, both inclusive, and the sum of $g$ and $m$ in Formula II being an integer of from 1 to 4, both inclusive.

In the present specification and claims, the term "alkyl" is employed to designate an alkyl radical being of from 1 to 12, both inclusive, carbon atoms; the terms "alkenyl" and "alkynyl," to designate alkenyl and alkynyl, respectively, radicals being of from 2 to 12, both inclusive, carbon atoms; the term "substituted alkyl," to designate an alkyl radical being of from 1 to 12, both inclusive, carbon atoms, and bearing one substituent selected from the group consisting of chloro, loweralkoxy, and dilower-alkylamino; the term "substituted phenyl," to designate a phenyl radical bearing from 1 to 2 substituents, each of which is independently selected from the group consisting of loweralkyl, chloro, loweralkoxy, and dilower-alkylamino; the terms "loweralkyl" and "loweralkoxy," to designate alkyl and alkoxy, respectively, radicals being of from 1 to 4, both inclusive, carbon atoms; and the term "halo," to designate bromo, chloro, and iodo.

More particularly, the present invention, in one part, is concerned with compound of the formula

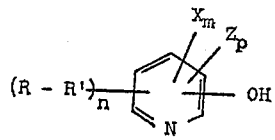

(I)

The products of this formula are crystalline solid or viscous materials which are somewhat soluble in many common organic solvents and of low solubility in water. The compounds are useful as pesticides and are especially adapted to be employed as active toxicants in compositions for the control, and, in particular for the selective control, of a number of arachnid, insect, helminth, bacterial and fungal organisms such as plum curculio, rootknot nematode, daphnia, mouse trichostrongylid and cockroach.

The products of the present invention wherein R' represent thio, which products are hereinafter designated "thio products," are prepared by several methods. In a preferred method (A) a halogenated pyridinol of the formula

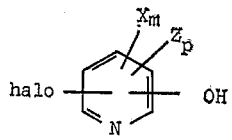

is reacted in the presence of a basic solvent with a cuprous mercaptide (Cu—S—R). In carrying out reaction (A), suitable basic solvents include the lutidines, pyridines, picolines, alkanolamines, and quinolines. Mixtures of such solvents can also be employed.

The cuprous mercaptide reactant can be employed directly or can be prepared in situ in any of several methods. For example, it can be prepared by reacting one molecular proportion of the corresponding disulfide, that is, compound of the formula R—S—S—R, with two gram-atoms of metallic copper. Also, the cuprous mercaptide reactant can be prepared in situ by reacting the corresponding free mercapto compound, or an alkali metal salt thereof, with a cuprous salt, such as cuprous bromide, cuprous chloride, or cuprous oxide. The reaction goes forward when employing only small quantities of cuprous salt; however, in order to obtain the desired cuprous mercaptide reactant in good yield, it is preferred to use an amount of cuprous salt which is equimolecular with the amount of free mercapto compound, or salt, used.

The amounts of halogenated pyridinol and cuprous mercaptide to be employed are not critical, some of the desired product being obtained when employing the reactants in any amounts. Good results are obtained when employing substantially one molecular proportion of halogenated pyridinol and a number of molecular proportions of cuprous mercaptide equal to the value of $n$. For example, where $n=1$, good results are obtained when employing equimolecular proportions of halogenated pyridinol and cuprous mercaptide; and where $n=3$, good results are obtained when employing one molecular proportion of halogenated pyridinol and three molecular proportions of cuprous mercaptide.

The reaction takes place smoothly at temperatures up to 250° C. The precise temperature to be employed in the preparation of a given product is dependent upon such factors as the identity of the halogen it is desired to replace, its location on the ring of the halogenated pyridinol reactant, and the identity of the cuprous mercaptide or disulfide. A halogen in the 2, 4, or 6 position on the ring is more easily replaced than a halogen in a 4 or 5 position. Similarly, iodine is more easily replaced than bromine, which in turn is more easily replaced than chlorine or fluorine. The temperature needed for displacement of a chlorine atom in the 3 or 5 position is about 180–220° C. A chlorine in the 2, 4, or 6 position, or a bromine in the 3 or 5 position can be replaced at about 150–170° C. A bromine in the 2, 4, or 6 position or an iodine in the 3 or 5 position can be replaced at temperatures of 100–140° C. An iodine in the 2, 4, or 6 position is advantageously replaced at temperatures of 100° C. or less, i.e., temperatures as low as 50° C.

Cuprous mercaptides may undergo an undesired decomposition according to the following equation:

$$2R-S-Cu \xrightarrow{\Delta} R-S-R + Cu_2S$$

The temperature at which this decomposition may take place is dependent upon the identity of the R group. If R is an aromatic group the decomposition temperature is about 250° C. If R is aliphatic, the decomposition temperature ordinarily is about 180° C., although certain aliphatic groups, such as cuprous tert-butyl mercaptide, decompose at still lower temperatures. Therefore, in view of the temperature requirements for displacement and of the temperature-dependent decomposition reaction, a chlorine in the 3 or 5 position can be replaced with the cuprous mercaptide reactant in this synthesis method only when R is an aromatic group; when it is desired to obtain an aliphatic thio group at the 3 or 5 position under these circumstances, a reactant having at the 3 or 5 position a halogen atom other than chlorine is employed.

In carrying out the reaction, the reactants are mixed and contacted together in any convenient fashion, and the resulting mixture maintained for a period of time in the reaction temperature range to complete the reaction. Following completion of the reaction, the product can be separated from the reaction mixture in conventional procedures. Most typically, solvent is removed by distillation, the resulting crude product residue dissolved in aqueous alkali and filtered to remove insoluble by-product, and the product recovered by neutralization of the alkaline filtrate followed by extraction of the solution with a low boiling solvent such as chloroform. The solvent is removed from the extract to obtain the purified product. The product can be further purified by conventional procedures such as washing with water, solvent extraction, chromatography, and recrystallization.

In another method (B), those products of the present invention wherein $R'$=thio and wherein $p$=0, are prepared by the alkylation of a mercaptopyridinol salt. In this method of preparation, a mercaptopyridinol salt of the formula

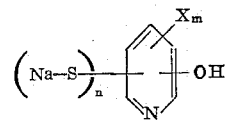

is reacted with an R-halo reactant.

The mercaptopyridinol salt is itself prepared by reacting another thio product

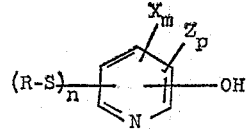

where R is preferably loweralkyl, such as methyl or ethyl, with metallic sodium in anhydrous ammonia, as more fully discussed hereinbelow. The resulting mercaptopyridinol salt is then reacted with the desired R-halo reactant and the mixture is heated to about 60–100° C. for about 1 to 2 hours. Good results are obtained when employing one molecular proportion of mercaptopyridinol salt and a number of molecular proportions of R-halo reactant equal to the value of $n$. After the reaction, the solvent is removed by distillation under reduced pressure to obtain the crude product as a residue. This product residue can be purified in conventional procedures; most typically the residue is taken up in chloroform or other suitable solvent, the resulting solution washed with water to remove water-soluble by-products and dried over anhydrous sodium sulfate, and solvent removed by distillation under reduced pressure.

In a yet further alternative method (C) for the preparation of products wherein $R'$=thio and the —OH group is on the 2-position of the pyridine ring, a mixture of (1) a pyridine-1-oxide compound of the formula

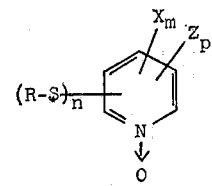

wherein at least one of the ring positions adjacent to the nitrogen ring atom is unsubstituted, and (2) acetic anhydride, is heated under reflux for a period of time. Ordinarily, the pyridine-1-oxide and acetic anhydride are employed in the ratio of one mole of pyridine-1-oxide with 300–500 milliliters of acetic anhydride, and the reaction is carried out over a period of from 15 minutes to three days. After the completion of the reaction, excess acetic anhydride is removed by distillation under reduced pressure to obtain a residue and the residue taken up in excess aqueous alkali hydroxide. The resulting mixture is then extracted with benzene and the aqueous part then brought to about pH 7 with HCl acid and extracted again with benzene. The benzene extracts are combined and dried and solvent removed therefrom under reduced pressure to separate the product which can be further purified in conventional procedures.

Those products of the present invention wherein $R'$ represents sulfinyl or sulfonyl are prepared from the thio products. In this preparation, one or more of the thio products is reacted with hydrogen peroxide, as a result of which the thio sulfur atom is oxidized, yielding initially the corresponding products where $R'$ represents sulfinyl, hereinafter designated as "sulfinyl products." When the sulfinyl products themselves are subjected to hydrogen peroxide, the thio sulfur atom is further oxidized, yielding the corresponding products where $R'$ represents sulfonyl, hereinafter designated as "sulfonyl products."

The reaction of thio product and hydrogen peroxide is exothermic and goes forward readily at temperatures of 20–110. The reaction is conveniently carried out in a liquid reaction medium, preferably an organic liquid. Suitable liquids include acetone, acetic acid, and, preferably, glacial acetic acid. The precise amounts of thio product and hydrogen peroxide employed are not critical, some of the corresponding sulfinyl or sulfonyl product being obtained when employing any amounts. However, in order to obtain the corresponding sulfinyl product in good yield, equimolecular proportions of thio product and hydrogen peroxide are employed. In order to obtain the corresponding sulfonyl product in good yield, one molecular proportion of thio compound and at least two, but usually not more than about 2.5, molecular proportions of hydrogen peroxide are employed.

In carrying out the reaction, the thio product and the hydrogen peroxide are contacted together, conveniently by adding one reactant to a mixture of the other reactant in liquid reaction medium. Conveniently, the hydrogen peroxide reactant is employed as an aqueous hydrogen peroxide solution. After the completion of the contacting, the reaction mixture can be held for a period of time, such as at elevated temperatures within the reaction temperature range or with stirring if desired, to carry forward the reaction.

The sulfinyl and sulfonyl products are separated, and if desired, purified, in conventional procedures of the sort hereinabove taught for other preparation procedures.

Certain of the thio products are advantageously prepared in another method (D). In this method, an aminopyridinesulfonyl chloride of the formula

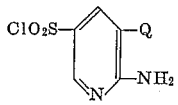

wherein Q represents hydrogen, bromo, chloro, or (chlorosulfonyl), is reduced with tin dichloride (SnCl$_2$) to prepare the corresponding free mercapto product as a complex with tin tetrachloride.

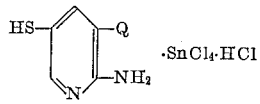

The complex thus prepared is reacted with methyl iodide in the presence of sodium hydroxide to prepare the corresponding (methylthio) compound.

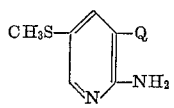

this compound is then diazotized by known procedures and the diazotized substance heated in an aqueous media to obtain product of the formula

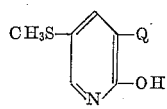

The desirable properties of the present products are inherent in the pure compounds; and when highly selective properties are to be relied upon, the purified compounds will be preferred. However, for many applications, wherein low cost is a major consideration, the reaction mixture wherein the product was prepared can be used with no steps whatsoever of separating or purifying product compounds therefrom, since by-products of reaction are often unobjectionable. Likewise, incompletely purified products can be used, when desired.

The following examples illustrate the best methods for carrying out the present invention and will enable those skilled in the art to practice the first present invention.

EXAMPLE 1.—5-(METHYLTHIO)-2-PYRIDINOL

A slurry of 23.5 grams (0.25 mole) of methyl disulfide, 28 grams (0.44 mole) of copper, and 250 milliliters of 2,4-lutidine was heated at 110–120° C. for four hours. After cooling the slurry to 70° C., 70 grams (0.4 mole) of 5-bromo-2-pyridinol was added and the mixture was heated under reflux for twenty-four hours. The lutidine was removed by distillation under reduced pressure and the residue was taken up in 250 milliliters of boiling 10 percent aqueous sodium hydroxide. The insoluble portion was collected by filtration and taken up in an additional 250 milliliters of boiling 10 percent aqueous sodium hydroxide. After the insoluble portion was removed by filtration, both filtrates were combined and brought to pH 7 with concentrated hydrochloric acid. The aqueous slurry was continuously extracted with chloroform for twenty-eight hours. The chloroform extract was concentrated to 500 milliliters and then placed on an alumina column and developed with additional chloroform. Chloroform was removed from the center cuts by evaporation under subatmospheric pressure to yield the desired 5-(methylthio)-2-pyridinol product as a solid residue. This product residue was recrystallized from ether-benzene, to yield 8.3 grams (14.8 percent yield) of a cream-colored solid, melting at 75–76° C.

*Analysis.*—Calcd. for C$_6$H$_7$NOS: C, 51.04; H, 5.00; S, 22.71. Found: C, 51.25; H, 5.07; S, 22.83.

EXAMPLE 2.—5-(ETHYLTHIO)-2-PYRIDINOL

A slurry of 35 grams (0.2 mole) of 5-bromo-2-pyridinol, 27.5 grams (0.22 mole) of cuprous ethylmercaptide, and 120 milliliters of 2,4-lutidine was heated at 155–165° to 24 hours. The lutidine was removed by distillation under reduced pressure and the residue was taken up in 400 milliliters of 10 percent aqueous sodium hydroxide. The insoluble material was removed by filtration through diatomaceous earth. The filtrate was extracted with three 500-milliliter portions of benzene and the aqueous solution was then brought to pH 7 with concentrated hydrochloric acid. The resulting mixture was extracted continuously with chloroform for 24 hours. The chloroform extracts were combined, and the chloroform was removed by evaporation. The black oily residue was taken up in 300 milliliters of chloroform and placed on an alumina column and developed with additional chloroform. The bulk of the material was collected in the second fraction. The chloroform was removed from this extract by evaporation and the residue repeatedly recrystallized from a mixture of benzene and a petroleum fraction boiling at 60–70° C. (Skelly-Solve), to yield 13.5 grams (46.5 percent) of the desired 5-(ethylthio)-2-pyridinol as a cream-colored solid melting at 79.5–80° C.

*Analysis.*—Calcd. for C$_7$H$_9$NOS: S, 20.66. Found: S, 20.68.

The corresponding 5-(ethylsulfinyl)-2-pyridinol product has a molecular weight of 171.2 and the corresponding 5-(ethylsulfonyl)-2-pyridinol product, a molecular weight of 187.2.

EXAMPLE 3.—5-(METHYLTHIO)-2-PYRIDINOL

To a solution of 31 grams (0.2 mole) of 5-(ethylthio)-2-pyridinol in 600 milliliters of liquid ammonia, 12.5 grams of sodium was added in small portions over two hours. When the addition was complete, the ammonia solution was concentrated to 100 milliliters and 100 milliliters of methanol added. The remaining ammonia was allowed to evaporate and the methanol solution was reduced to 20 milliliters. After the addition of 50 milliliters of water, the solution was brought to pH 6–7 with concentrated hydrochloric acid. After continuous extraction with chloroform for 16 hours, evaporation of the chloroform yielded 20.5 grams of 5-mercapto-2-pyridinol as a liquid residue. This residue was added to a solution of 3 grams of sodium in 250 milliliters of methanol and the resulting solution was treated with 18.5 grams of methyl iodide and stirred overnight. The methanol was removed by evaporation and the residue was extracted with chloroform. The chloroform was removed form the extract by evaporation and the residual oil was taken up in 100 milliliters of chloroform and placed on an alumina column and developed with additional chloroform. The center cuts were combined and chromatographed again. Evaporation of the chloroform from the center cuts yielded 2.5 grams of solid 5-(methylthio)-2-pyridinol product melting at 72–75° C. After recrystallization from ether-benzene, 2 grams of purified product (7 percent yield) melting at 75–76.5° C. were obtained.

The infrared spectra of this sample was identical to the spectra of 5-(methylthio)-2-pyridinol prepared by method A in Example 1.

EXAMPLE 4.—5-(ISOPROPYLTHIO)-2-PYRIDINOL

A slurry of 70 grams (0.4 mole) of 5-bromo-2-pyridinol, 36 grams (0.25 mole) of cuprous oxide, 40 grams (0.54 mole) of 2-propanethiol, and 240 milliliters of 2,4-lutidine was heated under reflux for twenty-two hours. The water of reaction was removed via a water separator. After the lutidine was removed by distillation under reduced pressure, the residue was taken up in 1.2 liter dilute sodium hydroxide. The insoluble material was removed by filtration and the filtrate was brought to pH 7 with concentrated hydrochloric acid. The aqueous slurry was extracted with five 500-milliliter portions of chloroform. The chloroform extracts were combined, and the chloroform was removed by evaporation to obtain an oil as residue. The residual oil was taken up in 250 milliliters of chloroform, placed on an alumina column, and developed with chloroform. The center cuts were carefully chromatographed again. Chloroform was removed by evaporation to obtain the desired 5-(isopropylthio)-2-pyridinol product. The product was repeatedly recrystallized from ether to yield 23 grams (34 percent) of purified product as a cream-colored solid melting at 53–54° C.

*Analysis.*—Calcd. for $C_8H_{11}NOS$: C, 56.78; H, 6.55; S, 18.95. Found: C, 56.87; H, 6.44; S, 19.01.

EXAMPLE 5.—5-(ISOPROPYLSULFINYL)-2-PYRIDINOL 5-(isopropylthio)-2-pyridinol (42.3 grams; 0.25 mole) was mixed with 100 milliliters of glacial acetic acid, and 28.3 grams of hydrogen peroxide (0.25 mole) added to the mixture as a 30 percent aqueous solution. The addition was carried out portionwise with stirring of the resulting reaction mixture. Thereafter, the reaction mixture was heated at reflux temperature for four hours, permitted to cool, and the glacial acetic acid removed by evaporation under subatmospheric pressure to obtain the desired 5-(isopropylsulfinyl)-2-pyridinol product as a residue. The product residue was mixed with a quantity of sodium bicarbonate solution and the product separated therefrom by repeated extractions with chloroform. The chloroform was removed from the combined extracts by evaporation under subatmospheric pressure to separate the product, which upon recrystallization from benzene ether, was found to be a white solid melting at 105–107° C. The product was obtained in a 68 percent yield.

*Analysis.*—Calcd. for $C_8H_{11}NO_2S$: C, 51.87; H, 5.99; S, 17.31. Found: C, 51.60; H, 5.77; S, 17.53.

EXAMPLE 6.—5-(ISOPROPYLSULFONYL)-2-PYRIDINOL 5-(isopropylthio)-2-pyridinol (40 grams; 0.24 mole) was mixed with 150 milliliters of glacial acetic acid and 56.5 grams of hydrogen peroxide (0.5 mole) added as a 30 percent aqueous solution thereof. The addition was carried out portionwise for a period of time, and at room temperature. Thereafter, the reaction mixture was heated at reflux temperature for 4 hours and then permitted to cool. Glacial acetic acid was removed from the reaction mixture by evaporation under subatmospheric pressure to obtain the desired 5-(isopropylsulfonyl)-2-pyridinol product as a residue. The product residue was washed with sodium bicarbonate solution and the washed product recrystallized from water. The recrystallized product, a white solid melting at 165–167° C., was obtained in a 75 percent yield.

*Analysis.*—Calcd. for $C_8H_{11}NO_3S$: C, 47.74; H, 5.51; S, 15.93. Found: C, 47.65; H, 5.22; S, 15.85.

EXAMPLE 7.—5-(PHENYLTHIO)-2-PYRIDINOL

A slurry of 43.5 grams (0.23 mole) of 5-bromo-2-pyridinol, 48.5 grams (0.28 mole) of cuprous phenyl mercaptide, and 150 milliliters of 2,4-lutidine was heated under reflux for twenty-two hours. The lutidine was removed by distillation under reduced pressure and the residue was taken up in 6 liters of dilute aqueous sodium hydroxide. The insoluble material was removed by filtration and the filtrate was brought to pH 7 with concentrated hydrochloric acid. The desired 5-(phenylthio)-2-pyridinol product precipitated in the acidified filtrate and was separated by filtration. The separated product was recrystallized from methanol-water.

The purified product, obtained in a yield of 50 percent, was a white crystalline solid melting at 180–181.5° C.

*Analysis.*—Calcd. for $C_{11}H_9NOS$: C, 64.99; H, 4.47; S, 15.78. Found: C, 64.99; H, 4.52; S, 15.87.

The corresponding 5-phenylsulfinyl-2-pyridinol product has a molecular weight of 219.3 and the corresponding 5-phenylsulfonyl-2-pyridinol product, a molecular weight of 235.3.

EXAMPLE 8.—6-(ETHYLTHIO)-2-PYRIDINOL

A slurry of 70 grams (0.54 mole) of 6-chloro-2-pyridinol, 75 grams (0.6 mole) of cuprous ethylmercaptide, and 350 milliliters of 2,4-lutidine was heated at 160–165° C. for 44 hours. The lutidine was removed by distillation, and the residue was taken up in 700 milliliters of 10 percent aqueous sodium hydroxide. The insoluble material was removed by filtration through diatomaceous earth. The filtrate was extracted with three 750-milliliter portions of ether. The aqueous solution was brought to pH 6 with concentrated hydrochloric acid and was then extracted continuously with chloroform overnight. The chloroform extract was concentrated to dryness by evaporation to obtain the desired 6-(ethylthio)-2-pyridinol product as a residue. The product residue was recrystallized from methyl cyclohexane and then taken up in 400 milliliters of chloroform and placed on an alumina column and developed with chloroform. The center fractions were combined, and the chloroform was removed by evaporation. The residue was recrystallized from methyl cyclohexane. As a result of these operations, the product, a tan powder melting at 105–106° C., was obtained in the amount of 38.5 grams (44 percent yield).

*Analysis.*— Calcd. for $C_7H_9NOS$: S, 20.66. Found: S, 20.62.

EXAMPLE 9.—6-ETHYLTHIO-2-PYRIDINOL

A solution of 64 grams (0.41 mole) of 2-(ethylthio)-pyridine-1-oxide and 150 milliliters of acetic anhydride was heated under reflux for 3 days. The acetic anhydride was removed by distillation under reduced pressure, and the residual black tar was taken up in 400 milliliters of 10 percent aqueous sodium hydroxide. The aqueous mixture was extracted with three 500 milliliter portions of benzene. The aqueous solution was brought to pH 7 with concentrated hydrochloric acid and extracted with three 500-milliliter portions of benzene. The benzene extracts were combined, and the benzene was removed by evaporation to obtain the desired 2-(thylthio)-2-pyridinol as a residue. This product residue, a semi-solid, was taken up in 400 milliliters of chloroform and placed on an alumina column and developed with additional chloroform. The center fractions were combined and the chloroform was removed by evaporation. The residue was twice recrystallized from methyl cyclohexane. As a result of these operations, 11 grams of the product were obtained (17 percent yield). The product was a cream solid melting at 105–106°.

EXAMPLE 10.—6-(ETHYLTHIO)-2-PYRIDINOL

After a slurry of 18 grams (0.16 mole) of ethyl disulfide, 17.5 grams (0.28 mole) of copper, and 150 milliliters of 2,4-lutidine was heated under reflux for 3 hours, 32.5 grams (0.25 mole) of 6-chloro-2-pyridinol was added and the reaction slurry was heated at 160–165° C. for 16 hours. The lutidine was removed by distillation under reduced pressure and the residue was taken up in 400 milliliters of 10 percent aqueous sodium hydroxide. The insoluble material was removed by filtration and the filtrate was extracted with 200 milliliters of benzene. The aqueous part was brought to pH 7 with concentrated hydrochloric acid and then extracted with chloroform overnight. The chloroform extracts were combined and the chloroform was removed by evaporation. The residue was recrystallized from methylcyclohexane. As a result of these operations, 34 grams (87.5 percent yield) of 6-(ethylthio)-2-pyridinol, a cream solid melting at 106–107.5° C., were obtained.

EXAMPLE 11.—3.5-BIS(ETHYLTHIO)-4-PYRIDINOL

A slurry of 100 grams (0.288 mole) of 3,5-diodo-4-pyridinol, 53 grams (0.63 mole) sodium ethylmercaptide, 4.4 grams (0.03 mole) of cuprous bromide and 200 milliliters of 2,4-lutidine was heated at 155–165° C. for 22 hours. The lutidine was removed by distillation under reduced pressure, and the residue was taken up in 400 milliliters of warm 10 percent aqueous sodium hydroxide. The insoluble material was removed by filtration. The aqueous filtrate was brought to pH 7 with dilute hydrochloric acid during which the 3,5-bis(ethylthio)-4-pyridinol product precipitated in the aqueous filtrate. The product was separated by filtration and recrystallized twice from a mixture of benzene and petroleum fraction boiling at 60–70° C. (Skellysolve). The recrystallized material was taken up in chloroform and poured on an alumina column and developed with a large quantity of methanol. The center fractions were collected, and the methanol was removed by evaporation leaving the purified product, a cream solid melting at 147–149° C., in a yield of 40 percent. (Some loss occurred due to breakage of reaction vessel).

*Analysis.*—Calcd. for $C_9H_{13}NOS_2$: S, 29.78. Found: S, 29.60.

The corresponding 3,5-bis(ethylsulfinyl)-4-pyridinol product has a molecular weight of 247.3, and the corresponding 3,5-bis(ethylsulfonyl) product, a molecular weight of 279.3.

EXAMPLE 12.—4,6-DIMETHYL-5-(ETHYLTHIO)-2-PYRIDINOL

A slurry of 38 grams (0.19 mole) of 5-bromo-4,6-dimethyl-2-pyridinol, 25 grams (0.2 mole) of cuprous ethylmercaptide, and 120 milliliters of 2,4-lutidine was held for a period of time in the reaction temperature range, and the 2,4-lutidine thereafter removed by distillation under reduced pressure. The distillation residue was treated with 300 milliliters of hot 10 percent aqueous sodium hydroxide. This aqueous slurry was then brought to pH 7 with 28 percent hydrobromic acid. The solid which separated on standing was collected by filtration and extracted continuously with ethanol overnight. After the ethanol was removed by evaporation, the residual oil was taken up in 250 milliters methanol and chromatographed on alumina. The center cuts yielded a solid material which was repeatedly recrystallized from methanol to give 8.6 grams (25 percent) of the 4,6-dimethyl-5-(ethylthio)-2-pyridinol product as a cream-colored solid melting at 138.5–139.5° C.

*Analysis.*—Calcd. for $C_9H_{13}NOS$: C, 58.98; H, 7.09; S, 17.49. Found: C, 59.11; H, 6.96; S, 17.23.

The corresponding 4,6-dimethyl-5-(ethylsulfinyl)-2-pyridinol product has a molecular weight of 199.3, and the corresponding 4,6-dimethyl-5-(ethylsulfonyl)-2-pyridinol, a molecular weight of 215.3.

EXAMPLE 13.—5-CHLORO-3-(ETHYLTHIO)-2-PYRIDINOL

A slurry of 36 grams (0.17 mole) of 3-bromo-5-chloro-2-pyridinol, 21.5 grams (0.175 mole) of cuprous ethylmercaptide, and 150 milliliters of 2,4-lutidine was heated under reflux for twenty hours. After the lutidine was removed by distillation under reduced pressure, the residue was treated with three 1-liter portions of hot 5-percent sodium hydroxide solution. The insoluble material was removed by filtration. The filtrate was cooled to 10° C. and the solid sodium salt which separated was collected by filtration. The sodium salt was taken up in 200 milliliters of water and the solution was brought to pH 6.5 with concentrated hydrochloric acid to obtain the desired 5-chloro-3-(ethylthio)-2-pyridinol product as a precipitate. The product was separated by filtration and recrystallized from a mixture of benzene and a petroleum fraction boiling at 60–70° C. (Skellysolve) to yield 9 grams (28 percent yield) of a cream colored solid melting at 158–159° C.

*Analysis.*—Calcd. for $C_7H_8ClNOS$: C, 44.33; H, 4.25; S, 16.9. Found: C, 44.44; H, 4.46; S, 16.9.

The corresponding 5-chloro-3-(ethylsulfonyl)-2-pyridinol product has a molecular weight of 221.7.

EXAMPLE 14.—5-(METHYLTHIO)-2-PYRIDINOL

Tin dichloride (216 grams; 1.4 moles) was mixed with 300 milliliters of concentrated hydrochloric acid. To this mixture, there was added 75 grams of 2-amino-5-pyridinesulfonyl chloride hydrochloride (0.33 mole). The addition was carried out portionwise, keeping the temperature of the resulting reaction mixture at 60–70° C. After the addition was complete, the reaction mixture was heated to reflux temperature and maintained for two hours. Thereafter, the reaction mixture was permitted to cool and the cooled mixture filtered to separate the tin tetrachloride complex of 2-amino-5-mercaptopyridine hydrochloride. The product was a tan crystalline solid.

Thereafter, 42.3 grams of this complex (0.1 mole) was mixed with 200 milliliters of water, and 12 grams of sodium hydroxide in 30 milliliters of water was added to the mixture. The addition was carried out portionwise, keeping the temperature below 20° C. After the addition was complete, methyl iodide (14.2 grams; 0.1 mole) was added to the mixture. The addition was carried out at room temperature, and the resulting reaction mixture stirred at room temperature for an additional two hour period. Thereafter, the reaction mixture was brought to a pH of 9 by the addition of sodium hydroxide solution, and thereafter extracted continuously with chloroform for 16 hours. Chloroform was removed from the extract by evaporation to obtain the desired 2-amino-5-(methylthio)pyridine product as a residue. The product residue was recrystallized from ether and found to be a cream-colored crystalline solid, melting at 65.5–66.5° C.

A portion of the 2-amino-5-(methylthio)pyridine product (7.0 grams; 0.05 mole) was mixed with 65 milliliters of 10 percent sulfuric acid, and 3.8 grams of sodium nitrite in 10 milliliters of water was added portionwise over a period of 10–15 minutes. The addition was carried out at such rate as to keep the temperature of the resulting mixture at about 0–5° C. After the addition was complete, the reaction mixture was permitted to warm to room temperature and then heated to a temperature of about 60° C. Thereupon, a saturated sodium bicarbonate solution was added to the heated mixture to bring the mixture to a pH of 6.5–7 and the mixture extracted with three 100 milliliter portions of chloroform. Chloroform was removed from the combined extracts by evaporation to obtain the desired 5-(methylthio)-2-pyridinol product as a residue. The product residue was recrystallized from ether and found to be a cream-colored solid, melting at 74.5–76° C. The infrared spectrum of this product was found to be identical with the spectrum of the same product when prepared by the procedures of Example 1.

Other representative thio, sulfinyl, and sulfonyl products are the following:

| Name of Product | Identifying Property, M.W. |
|---|---|
| 4-(methylthio)-3,5,6-trichloro-2-pyridinol | 244.5 |
| 5-(methylsulfinyl)-3-chloro-2-pyridinol | 191.6 |
| 5-(methylthio)-6-methyl-2-pyridinol | 155.2 |
| 5-(methylsulfonyl)-4,6-dimethyl-3-cyano-2-pyridinol | 216.3 |
| 5-(methylsulfinyl)-2-pyridinol (deg. C.) | [1] 153.5–154.5 |
| 5-(n-propylsulfinyl)-3-bromo-4-pyridinol | 264.2 |
| 4-(n-butylsulfonyl)-2-pyridinol | 215.3 |
| 5-(tert-butylthio)-3-nitro-2-pyridinol | 228.3 |
| 2,3,5,6-tetrakis(allylsulfonyl)-4-pyridinol | 511.6 |
| 5-(n-hexylsulfinyl)-6-methyl-2-pyridinol | 241.4 |
| 5-(1,1,3,3-tetramethylbutylsulfonyl)-2-pyridinol | 271.4 |
| 3,5-bis(n-decylthio)-4-pyridinol | 439.8 |
| 5-(1-butylheptylsulfinyl)-2-pyridinol | 297.5 |
| 5-(2-propenylsulfonyl)-3-ethyl-2-pyridinol | 227.3 |
| 6-(ethylsulfinyl)-2-pyridinol (deg. C.) | [1] 107.5–110 |
| 3-(allylthio)-5-n-butyl-4-pyridinol | 223.3 |
| 5-(1,2-dimethylpropenylsulfinyl)-2-pyridinol | 211.3 |
| 5-(1-hexylallylsulfonyl)-4,6-dimethyl-2-pyridinol | 311.5 |
| 5-(2-dodecen-1-ylthio)-3-chloro-2-pyridinol | 327.9 |
| 3-(ethylsulfinyl)-5-chloro-2-pyridinol (deg. C.) | [1] 216–216.5 |
| 3-chloro-5-(methylthio)-2-pyridinol | 175.6 |
| 5-(2-propynylsulfinyl)-3-isopropyl-2-pyridinol | 223.3 |
| 5-(5-decyn-1-ylsulfonyl)-3-chloro-4-pyridinol | 331.9 |
| 5-(4-chlorobutylsulfinyl)-3-pyridinol | 233.7 |
| 5-(2-ethoxyethylthio)-3-iodo-4-pyridinol | 325.2 |
| 5-(methylsulfonyl)-2-pyridinol (deg. C.) | [1] 247–248.5 |
| 5-(6-(dimethylamino)hexylsulfinyl)-6-methyl-2-pyridinol | 284.4 |
| 5-(10-chlorodecylsulfonyl)-4,6-dimethyl-2-pyridinol | 361.9 |
| 3,5,6-tris(phenylsulfinyl)-2-pyridinol | 467.6 |
| 5-(phenylthio)-3-cyano-2-pyridinol | 228.3 |
| 2-(p-chlorophenylsulfinyl)-4-pyridinol | 253.7 |
| 5-(3,5-xylylsulfonyl)-3-methyl-2-pyridinol | 277.3 |
| 3,5-bis(2-chloro-4-tert-butylphenyl-thio)-4-pyridinol | 492.5 |
| 4-(o-ethoxyphenylsulfinyl)-2-pyridinol | 263.3 |
| 5-(m-(di-n-propylamino)phenylsulfonyl)-3-methyl-2-pyridinol | 348.5 |
| 6-(ethylsulfonyl)-2-pyridinol (deg. C.) | [1] 122–123.5 |
| 3,4,5,6-tetrakis(methylthio)-2-pyridinol | 279.5 |
| 6-(methylthio)-3-pyridinol | 141.2 |

[1] Melting point.

The thio, sulfinyl, and sulfonyl products are useful as pesticides in a variety of household, industrial, and agricultural operations. They can also be included in inks, adhesives, soaps, polymeric materials, cutting oils or in oil or latex paints. They can be distributed in textiles, cellulosic materials, or in grains, or can be employed in the impregnation of wood and lumber. Additionally, they can be applied to seeds. In yet other procedures, the compounds can be vaporized or sprayed or distributed as aerosols into the air, or onto surfaces in contact with the air. They can be employed in liquid or dust formulations as desired.

In a second part, the present invention is concerned with mercaptopyridinol compound of the formula II
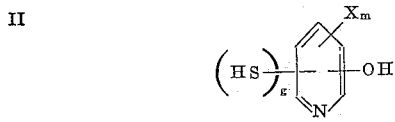

and S-metal salt of Formula II, whereof the metal is a member selected from the group consisting of sodium, potassium, copper $^{(+1)}$, tin $^{(+2)}$, lead $^{(+2)}$, and zinc. The definitions of the symbols X, m, and g are here repeated for the convenience of the reader: each X independently represents a member selected from the group consisting of bromo, chloro, and loweralkyl; m represents an integer of from 0 to 3, both inclusive, and g represents an integer of from 1 to 2, both inclusive, the sum of g and m in Formula II being an integer of from 1 to 4, both inclusive. The products of Formula II are hereinafter called "free mercapto products," and the S-metal salts of Formula II are hereinafter called "mercapto salt products."

All of these products are crystalline solid or viscous materials. Typically, the free mercapto products are somewhat soluble in organic solvents and water, and the mercapto salt products are of low solubility in organic solvents and of low to high solubility in water, depending upon the identity of the metal. The compounds are useful as pesticides and are especially adapted to be employed as active toxicants in compositions for the control, and, in particular, for the selective control, of a number of arachnid, insect, helminth, bacterial and fungal organisms such as plum curculio, rootknot nematode, daphnia, mouse trichostrongylid and cockroach.

Unlike the corresponding thio products, sulfinyl products, and sulfonyl products, the free mercapto products and the mercapto salt products can be employed to prepare S-substituted products, such as S-ester products. They can be thus employed because in free mercapto products and mercapto salt products reaction at the site of the sulfur atom occurs more readily than reaction at the site of the oxygen atom, whereas in the corresponding thio, sulfinyl, or sulfonyl products, reaction occurs at the site of the oxygen atom.

The free mercapto products are prepared by a first method (E) which comprises reacting a starting hydrocarbylthio pyridinol compound of the formula

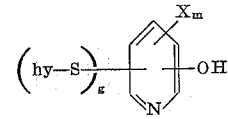

wherein the hydrocarbyl group is preferably a loweralkyl group such as methyl, with metallic sodium in the presence of anhydrous ammonia for methylamine to cleave the hydrocarbyl group and prepare the corresponding sodium salt. The reaction mixture containing this product is then brought to faintly acid condition to prepare the corresponding free mercapto product:

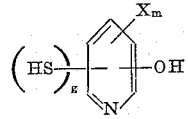

In carrying out the cleavage reaction, good results are obtained when employing the reactants in amounts representing one molecular proportion of hydrocarbylthio pyridinol compound and a number of gram atoms of sodium equal to the value of $1+2g$. The reaction takes place smoothly at temperatures between the melting and boiling points of the reaction medium employed; however, the reaction is most typically conducted at reflux.

In carrying out the reaction, the reactants are contacted together in any convenient fashion, most typically by adding the sodium to a solution comprising the hydrocarbylthio pyridinol and the ammonia or methylamine. The reaction goes forward readily with the preparation of the desired product; completion of the reaction is indicated when, upon addition of a further portion of sodium, the reaction mixture turns blue and remains so colored. Because of possible side reactions, it is preferred that the desired sodium salt product, shortly after completion of the reaction, be separated. The sodium salt is taken up in water or in alkanol and the resulting mixture containing it brought to faintly acidic condition, such as by the addition of a sufficient amount of a mineral acid such as hydrochloric acid. As a result of this procedure, the corresponding free mercapto product is prepared and can be separated by conventional procedures, such as filtration, removal of solvent by evaporation, or, most typically, extraction of the free mercapto product with a suitable organic liquid, such as chloroform, ether, benzene or the like, followed by evaporation of the liquid.

In a second method (F) for the preparation of the mercapto products, a halo starting material of the formula

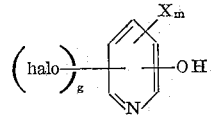

is employed. The halo moiety in each of the g instances, is of equal or greater molecular weight, and, correspondingly, reactivity, than any halogen atom represented by any X symbol. This halo starting material is reacted with sodium hydrosulfide (NaSH) or potassium hydrosulfide (KSH) to replace the halo atom with the free —SH group. This replacement reaction is conveniently carried out in an organic liquid as inert liquid reaction medium. Suitable liquids include propylene, glycols, glycerine, mono- and dialkyl ethers of ethylene glycols. Metallic copper can be employed to catalyze the reaction, but its use is not necessary. Good results are obtained when employing the reactants in amounts representing one molecular proportion of halo starting material and a number of molecular proportions of sodium or potassium hydrosulfide equal to the value of g. In the instance wherein no X substituent is bromo or chloro, even higher yields can be obtained by employing an excess of the sodium or potassium hydrosulfide reactant. The reaction takes place smoothly at temperatures of from 150 to 250° C., and preferably, at temperatures of 180–200, with the production of the desired product and sodium or potassium chloride byproduct.

In carrying out the reaction, the reactants are contacted together in any convenient fashion and maintained for a period of time in the reaction temperature range to complete the reaction. Some product is produced immediately upon the contacting together of the reactants: however, higher yields result when the reaction mixture is permitted to stand for a period of time in the reaction temperature range. Following the completion of the reaction, the reaction medium is removed by distillation or evaporation under reduced pressure to obtain the desired product as a residue. This residue is taken up in water and brought to slightly acidic condition. Thereupon, the product is separated by conventional procedures, such as filtration or extraction with an organic liquid, such as ether, benzene, or chloroform, and subsequent removal of the liquid by evaporation under subatmospheric pressure.

Another synthesis method (G) is advantageously employed to prepare those free mercapto products of the formula

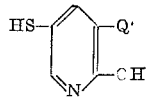

wherein Q' is hydrogen, bromo, chloro, or mercapto (—SH). In this method, a starting material of the formula

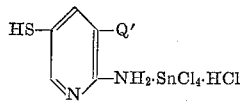

is reacted with sodium sulfide in an acidic medium and thereafter filtered to obtain the uncomplexed material as a sodium salt:

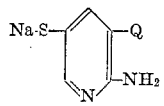

This sodium salt is then oxidized to obtain the corresponding bis(aminopyridyl)disulfide product,

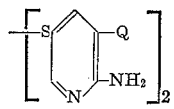

which is subsequently diazotized to obtain the corresponding bis(hydroxypyridyl)disulfide compound. This compound is then hydrogenated to cleave the disulfide bond and prepare the desired free mercapto pyridinol compound of the above formula.

The mercapto salt products of the present invention, as to structural formula, are of several general types, depending upon whether the metal is monovalent or divalent and further, where the metal is divalent, upon the value of g. The monovalent metal salts are of the general structural formula:

IV
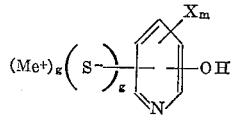

The divalent metal dipyridyl salts are of the formula

V
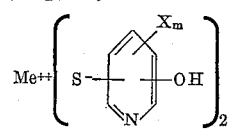

The divalent metal monopyridyl salts, that is, "internal salts," are of the formula VI
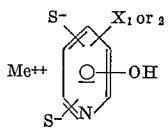

wherein the two sulfur atoms are attached to ring carbon atoms ortho to one another. Sometimes, as is typical of compounds having two functional groups, the mercapto salt products whereof the metal is divalent and g is 2 exist in a form having the following repeating structural formula:

VII
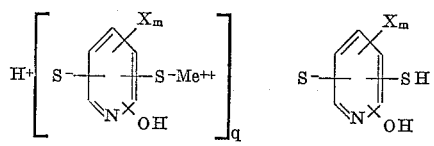

wherein q is an integer of at least one.

All of the mercapto salt products are prepared from the corresponding free mercapto products in known procedures for the preparation of metal salts. The free mercapto product is reacted with a metal reactant, most typically a metal hydroxide, a metal alkoxide, a metal chloride, or metal acetate having the desired metal moiety. The reaction is preferably carried out in an inert liquid, such as water or alcohol. The reaction goes forward at temperatures of 0 to 100° C., with the preparation of the desired salt and of byproduct, the identity of which varies with the metal reactant.

The amounts of the reactants employed are not critical, some of the desired product being obtained when employing the reactants in any amounts. However, the reactants are consumed in amounts which represent stoichiometric proportions, and the use of reactants in amounts representing such proportions is preferred. In the instance of products of Formula V, the reactants are consumed in amounts representing two molecular proportions of free mercapto product and one molecular proportion of metal reactant. In the instance of products of Formulas IV and VI, the reactants are consumed in amounts representing equimolecular proportions. The products can exist as Formula VII when the reactants are employed in widely varying amounts; most typically, however, this form exists when equimolecular proportions are employed.

The following examples illustrate the best methods for the preparation of the free mercapto products and mercapto salt products, and will enable those skilled in the art to practice the second part of the present invention.

EXAMPLE 15.—5-MERCAPTO-2-PYRIDINOL

To a solution of 31 grams (0.2 mole) of 5-(ethylthio) 2-pyridinol in 600 milliliters of liquid ammonia, 12.5 grams of sodium were added in small portions over two hours. When the addition was complete, the ammonia solution was concentrated to 100 milliliters and 100 milliliters of methanol added. The remaining ammonia was allowed to evaporate, and the resulting methanol solution reduced to 20 milliliters and diluted with 50 milliliters of water. The diluted solution was brought to pH 6–7 with concentrated hydrochloric acid. After continuous extraction with chloroform for 16 hours, evaporation of the chloroform yielded 20.5 grams of 5-mercapto-2-pyridinol as a liquid residue. This product was analyzed by infrared spectroscopy and found to have a spectra consistent with the expected structure, including bands at 870 and at 2500 centimeters $^{-1}$, corroborating the presence of the —SH group.

EXAMPLE 16.—5-MERCAPTO-2-PYRIDINOL, S-SODIUM SALT

To a solution of 3.7 grams of sodium in 100 milliliters of methanol, 20.5 grams of 5-mercapto-2- pyridinol (0.16 mole) is added. The addition is carried out at room temperature. The reaction mixture is then stirred for 30 minutes and methanol removed by evaporation to obtain the 5-mercapto-2-pyridinol, S-sodium salt as a residue. The product has the following structural formula

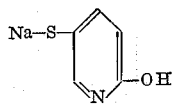

and a molecular weight of 149.2.

EXAMPLE 17.—4-MERCAPTO-3,5,6-TRICHLORO-2-PYRIDINOL

Potassium hydrosulfide (80 grams; 1.1 mole) is mixed in 800 milliliters of propylene glycol, and copper (2.0 grams) and 3,4,5,6-tetrachloro-2-pyridinol (232.9 grams; 1.0 mole) are added to the mixture. The mixture is heated at 180–190° for 24 hours, and then cooled to room temperature. The solvent is removed from the mixture by evaporation under subatmospheric pressure to obtain the desired 4-mercapto-3,5,6-trichloro-2-pyridinol as the residue. This product residue is taken up in water and brought to pH 5–7 with dilute hydrochloric acid. The product is collected by filtration, as a white solid melting at 208–209°.

EXAMPLE 18.—5-MERCAPTO-2-PYRIDINOL

To a solution of 2-amino-5-mercaptopyridine complex with tin tetrachloride, hydrochloride (42.3 grams; 0.1 mole), sodium sulfide (28 grams; 0.5 mole), and 100 milliliters of water, 90 milliliters of 10 percent hydrochloric acid is added portionwise. After the addition is complete, the reaction mixture is heated under reflux for 30 minutes and then filtered. The filtrate is brought to pH 10–12 by addition of sodium hydroxide solution, treated with a stream of air for 40 hours, and then extracted with chloroform. Chloroform is removed from the extract by evaporation to separate the bis(2-amino-5-pyridyl) disulfide material. This material is taken up in 200 milliliters of 10 percent sulfuric acid and sodium nitrite (16 grams) in 80 milliliters of water added thereto. The addition is carried out portionwise, keeping the temperature of the reaction mixture at 0–5° C. After the addition is complete, the reaction mixture is heated to 60° C. and brought to pH 7 with sodium hydroxide. The reaction mixture is then filtered to separate the corresponding bis(2-hydroxy-5-pyridyl)disulfide which is subsequently taken up in toluene and hydrogenated at 1800 p.s.i. and 140° C. in the presence of molybdenum disulfide catalyst. The resulting mixture is filtered to remove the catalyst and toluene removed by evaporation under subatmospheric pressure to obtain the desired 5-mercapto-2-pyridinol product. The product has an infrared spectra which is identical with the spectra of the same product when prepared in the procedures of Example 15.

Other representative free mercapto products and mercapto salt products include the following:

By cleavage of 5-(methylthio)-2,4-dimethyl-3-pyridinol (molecular weight of 169.3) with sodium in liquid ammonia, 5-mercapto-2,4-dimethyl-3-pyridinol product having a molecular weight of 155.2. The corresponding potassium salt product has a molecular weight of 193.3

From 3-n-butyl-4,5,6-trichloro-2-pyridinol and sodium hydrosulfide, 4-mercapto-3-n-butyl-5,6-dichloro-2-pyridinol product having a molecular weight of 252.2.

By cleavage of 5-(ethylthio)-6-methyl-2-pyridinol with sodium in liquid ammonia, 5-mercapto-6-methyl-2-pyridinol product having a molecular weight of 141.2. This product can be reacted with cuprous chloride to prepare the corresponding 5-mercapto-6-methyl-2-pyridinol, cuprous salt.

From 4,6-dichloro-2-pyridinol and potassium hydrosulfide, 4,6-dimercapto-2-pyridinol product having a molecular weight of 159.2.

From 2,3,5,6-tetrachloro-4-pyridinol and sodium hydrosulfide, 2,6-dimercapto-3,5-dichloro-4-pyridinol product having a molecular weight of 228.1.

From 3,5-diiodo-4-pyridinol and potassium hydrosulfide, 3,5-dimercapto-4-pyridinol product having a molecular weight of 159.2. This product is reacted with lead acetate to prepare the corresponding 3,5-dimercapto-4-pyridinol, lead$^{(+2)}$ salt.

From 5-mercapto-3-chloro-2-aminopyridine by method (G), 5-mercapto-3-chloro-2-pyridinol product having a molecular weight of 161.6.

By cleavage of 5-(ethylthio)-4,6-diisopropyl-2-pyridinol (molecular weight of 227.4) with sodium in liquid ammonia, 5-mercapto - 4,6 - diisopropyl-2-pyridinol product having a molecular weight of 211.3.

From 5,6-dibromo-2-pyridinol and potassium hydrosulfide, 6-mercapto-5-bromo-2-pyridinol product having a molecular weight of 206.1. This product is reacted with zinc oxide to prepare the corresponding 6-mercapto-5-bromo-2-pyridinol, zinc salt (molecular weight of 283.6).

By cleavage of 3,5-bis(methylthio)-6-methyl-2-pyridinol (molecular weight of 113.3) with sodium in liquid ammonia, 3,5 - dimercapto-6-methyl-2-pyridinol product having a molecular weight of 173.3.

By cleavage of 3,5-bis(ethylthio)-6-sec-butyl-2-pyridinol with sodium in liquid ammonia, 3,5-dimercapto-6-sec-butyl-2-pyridinol product having a molecular weight of 215.3. This product is reacted with tin dichloride to prepare the corresponding tin$^{(+2)}$ salt.

The free mercapto products and the mercapto salt products are useful as pesticides in a variety of household, industrial, and agricultural operations. They can also be included in inks, adhesives, soaps, polymeric materials, cutting oils or in oil or latex paints. They can be distributed in textiles, cellulosic materials, or in grains, or can be employed in the impregnation of wood and lumber. Additionally, they can be applied to seeds. In yet other procedures, the compounds can be vaporized or sprayed or distributed as aerosols into the air, or onto surfaces in contact with the air. They can be employed in liquid or dust formulations as desired.

We claim:

1. Pyridinol compound selected from the group consisting of

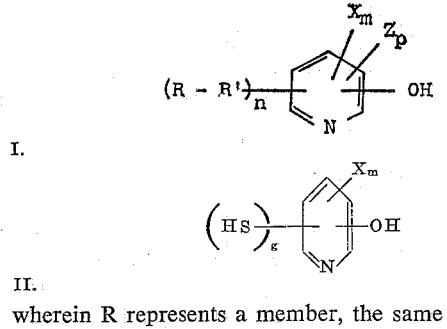

wherein R represents a member, the same in each occurrence, selected from the group consisting of alkyl being of from 1 to 12, both inclusive, carbon atoms, substituted alkyl being of from 1 to 12, both inclusive, carbon atoms, and bearing one substituent selected from the group consisting of chloro, loweralkoxy, and diloweralkylamino, in which the terms "loweralkyl" and "loweralkoxy" designate alkyl and alkoxy, respectively, radicals being of from 1 to 4, both inclusive, carbon atoms, alkenyl being of from 2 to 12, both inclusive, carbon atoms, alkynyl being of from 2 to 12, both inclusive, carbon atoms, phenyl, and substituted phenyl bearing 1 to 2 substituents, each of which is independently selected from the group consisting of loweralkyl, chloro, loweralkoxy, and diloweralkylamino, in which the terms "loweralkyl" and "loweralkoxy" are as above defined; R' represents a member, the same in each occurrence, selected from the group consisting of thio, sulfinyl, and sulfonyl; each X independently represents a member selected from the group consisting of bromo, chloro, and loweralkyl being of from 1 to 4, both inclusive, carbon atoms; Z represents a member selected from the group consisting of nitro and iodo; $n$ represents an integer of from 1 to 4, both inclusive; $m$ represents an integer of from 0 to 3, both inclusive; $p$ represents an integer of from 0 to 1, both inclusive; $g$ represents an integer of from 1 to 2, both inclusive, the sum of $n$, $m$, and $p$ in Formula I being an integer of from 1 to 4, both inclusive, and the sum of $g$ and $m$ in Formula II being an integer of from 2 to 4, both inclusive; and (III)  S-metal salt of (II)

wherein the metal is a member selected from the group consisting of sodium and potassium.

2. 5-(methylthio)-2-pyridinol.
3. 5-(ethylthio)-2-pyridinol.
4. 5-(isopropylthio)-2-pyridinol.
5. 5-(isopropylsulfinyl)-2-pyridinol.
6. 5-(isopropylsulfonyl)-2-pyridinol.
7. 5-(phenylthio)-2-pyridinol.
8. 6-(ethylthio)-2-pyridinol.
9. 6-(ethylsulfinyl)-2-pyridinol.
10. 6-(ethylsulfonyl)-2-pyridinol.
11. 3,5-bis(ethylthio)-4-pyridinol.
12. 4,6-dimethyl-5-(ethylthio)-2-pyridinol.
13. 5-chloro-3-(ethylthio)-2-pyridinol.
14. 5-chloro-3-(ethylsulfinyl)-2-pyridinol.
15. 5-(methylsulfinyl)-2-pyridinol.
16. 5-(methylsulfonyl)-2-pyridinol.
17. 5-(methylsulfinyl)-3-chloro-2-pyridinol.
18. 5-(methylsulfinyl)-6-methyl-2-pyridinol.
19. 4-(methylthio)-3,5,6-trichloro-2-pyridinol.
20. 4-mercapto-3,5,6-trichloro-2-pyridinol.
21. 3-chloro-5-(methylthio)-2-pyridinol.
22. 3,5-dimercapto-4-pyridinol.

References Cited

UNITED STATES PATENTS 1,753,658   4/1930   Kochendoerfer _____ 260—294.8

OTHER REFERENCES

Klingsberg: Pyridine and Derivatives, part four, Interscience (May 1964), pp. 354 and 384.

Steiger: Chem. Abstracts, vol. 44, par. 8380–C (1950).

WALTER A. MODANCE, *Primary Examiner.*

ALAN L. ROTMAN, *Assistant Examiner.*